US008508784B2

(12) United States Patent
Miyata

(10) Patent No.: US 8,508,784 B2
(45) Date of Patent: Aug. 13, 2013

(54) RECORDING MEDIUM SIZE COMPENSATION FOR IMAGE FORMING SYSTEMS

(75) Inventor: Yuji Miyata, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1011 days.

(21) Appl. No.: 12/055,781

(22) Filed: Mar. 26, 2008

(65) Prior Publication Data

US 2008/0240751 A1 Oct. 2, 2008

(30) Foreign Application Priority Data

Mar. 28, 2007 (JP) ................................ 2007-084290

(51) Int. Cl.
*G06K 15/00* (2006.01)
*G06F 3/12* (2006.01)
*H04N 1/393* (2006.01)

(52) U.S. Cl.
USPC ......... 358/1.18; 358/1.2; 358/1.13; 358/1.14; 358/1.15; 358/449; 358/451

(58) Field of Classification Search
USPC ............ 358/1.1–1.18, 1.2, 449, 451; 399/45, 399/81
See application file for complete search history.

(56) References Cited

U.S. PATENT DOCUMENTS 4,839,737 A * 6/1989 Saito ............................ 358/406
5,485,282 A * 1/1996 Takeda .......................... 358/435
5,828,818 A * 10/1998 Anzai .......................... 358/1.18
6,678,068 B1 * 1/2004 Richter et al. ............... 358/1.15
6,961,148 B2 * 11/2005 Simpson et al. ............... 358/1.9
7,224,482 B2 5/2007 Shima
7,280,782 B2 * 10/2007 Maeda et al. ................... 399/81
7,372,590 B2 5/2008 Kuroda
7,551,311 B2 * 6/2009 Uotani ......................... 358/1.18
7,761,021 B2 * 7/2010 Takeuchi ........................ 399/81
8,368,911 B2 * 2/2013 Hirosugi et al. ............. 358/1.14
8,373,889 B2 * 2/2013 Arai ............................ 358/1.18

(Continued)

FOREIGN PATENT DOCUMENTS

EP 1582365 A1 * 10/2005
JP 08-095427 4/1996

(Continued)

OTHER PUBLICATIONS

JP Office Action: Application No. 2007-084290, Reference No. 2006-02920, Dispatch No. 790846, Dispatch Date: Jan. 6, 2009.

(Continued)

*Primary Examiner* — Dennis Dicker
(74) *Attorney, Agent, or Firm* — Banner & Witcoff, Ltd.

(57) ABSTRACT

An image forming system may be configured to compensate for and register various sizes of recording media on which image formation data may be recorded. For example, the image formation data may be edited with application software for various sizes of recording media. Accordingly, the image forming system may include a size detecting unit configured to detect size information of the recording medium and/or a registration unit configured to register the size information detected by the size detecting unit as setting information. The image forming system may further include a reflecting unit configured to reflect a selected setting information within the application software (e.g., an editing function thereof) with which the information terminal device can edit the image formation data so as to conform to the size information.

14 Claims, 5 Drawing Sheets

(56) References Cited

U.S. PATENT DOCUMENTS

| | | | | |
|---|---|---|---|---|
| 2003/0184781 | A1* | 10/2003 | Laughlin | 358/1.13 |
| 2004/0101326 | A1* | 5/2004 | Hoene et al. | 399/77 |
| 2004/0160629 | A1* | 8/2004 | Hull et al. | 358/1.15 |
| 2006/0239731 | A1* | 10/2006 | Suzuki et al. | 399/389 |
| 2006/0262336 | A1* | 11/2006 | Venkatachalam et al. | 358/1.13 |
| 2006/0268328 | A1* | 11/2006 | Park et al. | 358/1.15 |
| 2007/0177201 | A1* | 8/2007 | Tanaka et al. | 358/1.15 |
| 2008/0037059 | A1* | 2/2008 | Inoue | 358/1.15 |
| 2009/0073476 | A1* | 3/2009 | Torikoshi | 358/1.13 |
| 2010/0134806 | A1* | 6/2010 | Fujiwara | 358/1.2 |
| 2012/0086652 | A1* | 4/2012 | Kim et al. | 345/173 |

FOREIGN PATENT DOCUMENTS

| | | |
|---|---|---|
| JP | 08-166944 | 6/1996 |
| JP | 10-063454 | 3/1998 |
| JP | 2000-032248 | 1/2000 |
| JP | 2001-197292 | 7/2001 |
| JP | 2001-301265 | 10/2001 |
| JP | 2002-091723 | 3/2002 |
| JP | 2004-005194 | 1/2004 |
| JP | 2004-066567 | 3/2004 |
| JP | 2004-234216 | 8/2004 |
| JP | 2005-078154 | 3/2005 |
| JP | 2005-297360 | 10/2005 |
| JP | 2006-231706 | 9/2006 |
| JP | 2006-239929 | 9/2006 |

OTHER PUBLICATIONS

Decision of Rejection mailed in Japanese Application No. 2007-084290 dated Apr. 1, 2009 with translation.

* cited by examiner

90

| | PAPER SIZE NAME | SIZE | DIRECTION |
|---|---|---|---|
| 1 | TEST PAPER | 370 × 250 | PORTRAIT |
| 2 | TEST PAPER | 250 × 370 | LANDSCAPE |
| 3 | TEST ENVELOPE | 200 × 100 | PORTRAIT |

RECORDING MEDIUM SIZE COMPENSATION FOR IMAGE FORMING SYSTEMS

CROSS-REFERENCE TO RELATED APPLICATION

This application claims priority under 35 U.S.C. §119 from Japanese Patent Application No. 2007-084290 filed on Mar. 28, 2007. The entire subject matter of the application is incorporated herein by reference.

BACKGROUND

1. Technical Field

The following description relates to one or more image forming techniques including an image forming system and a computer readable medium therefor.

2. Related Art

Conventionally, a general image forming system has been provided with an image forming device configured to form an image on a recording medium based on image formation data and an information terminal device configured to send edited image formation data to the image forming device with application software. Further, in the image forming system, size information for a plurality of kinds of recording media (such as height and width of a rectangle sheet) is previously registered or additionally registered through a user input with the application software such that the image formation data can be edited to conform to the size information of the plurality of kinds of recording media.

Additionally, there is disclosed in Japanese Patent Provisional Publication No. 2006-239929 (hereinafter, referred to as '929 Publication), an image forming system provided with an image scanning device. In such an image forming system, image data which are previously formed on a recording medium (referred to as a "preprinted paper") are scanned by the image scanning device. Then, image formation data edited by application software and the scanned image data of the preprinted paper are displayed on an information terminal device in a superimposed manner. Thereby, it is possible for a user to previously confirm a final image obtained by the image formation.

SUMMARY

However, in the aforementioned conventional image forming system, when using a recording medium of which the size information is not registered with the application software, the user has to accurately measure the height and width and configure additional settings by manually inputting them through the information terminal device. Thus, the user is compelled to bear troublesome operations.

In addition, the image forming system disclosed in '929 Publication merely controls the information terminal device to display the image formation data edited with the application software and image data on the preprinted paper in the superimposed manner. Therefore, the user has to modify the image formation data such that the image formation data can be printed within an area on the preprinted paper in which the image formation can appropriately achieved. At this time, when the image formation data are enlarged or reduced, there might be caused an undesired situation that the layout of the image on the recording medium becomes less balanced, or a margin is excessively enlarged.

Aspects of the present invention are advantageous in that there can be provided one or more improved image forming systems that make it possible to easily edit image formation data that conform to a recording medium.

According to aspects of the present invention, there is provided an image forming system, which includes an information terminal device configured to edit image formation data with application software, an image forming device configured to form an image on a recording medium based on the image formation data edited by the information terminal device, a first detecting unit configured to detect size information of the recording medium, a registration unit configured to register the size information detected by the first detecting unit as setting information, and a reflecting unit configured to reflect desired one of setting information registered by the registration unit on the application software with which the information terminal device can edit the image formation data so as to conform to the size information.

According to another aspect of the present invention, there is provided an image forming system, which includes an information terminal device configured to edit image formation data with application software, an image forming device configured to form an image on a recording medium based on the image formation data edited by the information terminal device, a first detecting unit configured to detect size information of the recording medium, a second detecting unit configured to detect direction information of the recording medium that represents an in-plane direction in which the recording medium is turned with respect to the image forming device, an input unit configured to accept an input of size name of the recording medium, a registration unit configured to register the size information detected by the first detecting unit, the direction information detected by the second detecting unit, and the size name inputted through the input unit as setting information, an adding unit configured to add the setting information registered by the registration unit to setting items for the application software, a selecting unit configured to accept an input for selecting desired setting information from the setting items, and a reflecting unit configured to reflect the desired setting information selected by the selecting unit on the application software with which the information terminal device can edit the image formation data so as to conform to the size information.

According to some aspects, the first detecting unit detects size information of the recording medium is detected, and the registration unit registers the detected size information as setting information.

Here, the size information includes information regarding a shape (such as a contour) of the recording medium (which includes not only a general rectangular shape but also other shapes) and information regarding dimensions of the recording medium (for example, height and width of a rectangle recording medium). In addition, the setting information includes information generated based on the size information so as to be used for various settings for the application software.

In addition, the reflecting unit reflects desired one of setting information registered by the registration unit on the application software such that the image formation data can be edited in accordance with the size information. Specifically, the reflecting unit adds the desired setting information to setting items of the application software, and/or enlarges or reduces an editable area of the application software based on the desired setting information.

Therefore, the user can easily edit the image formation data with the application software such that an image based on the image formation data is not formed beyond the recording medium or with an excessively enlarged margin. Further, the user is not required to measure accurate the height and width of the recording medium and manually input the measured lengths as additional settings through the information terminal device. Hence, troublesome operations that the user has to perform are reduced.

Accordingly, with the above configurations, the image formation data can easily be edited so as to conform to the recording medium.

The image formation data edited with the application software may include text data, image data such as photographic image data, and outline data.

The contour of the recording medium is not limited to a rectangle shape. The contour may include a complicated contour such as a polygonal shape. For example, since an operation of conveying the recording medium is not required when the image forming device is an X-Y plotter, there is no problem even though the contour of the recording medium is a polygonal shape.

The first detecting unit may be any unit configured to detect the size information of the recording medium. For example, a scanner, which is widely known as an image scanning device, may be employed as the first detecting unit. The first detecting unit may be provided integrally to the image forming device or information terminal device, or may separately be provided.

According to a further aspect of the present invention, there is provided a computer readable medium having computer readable instructions stored thereon, which cause a computer, configured to edit image formation data with application software and to be connectable with an external image forming device that forms an image on a recording medium based on the edited image formation data, to perform steps of detecting size information of the recording medium, registering the size information detected in the detecting step as setting information, and reflecting desired one of setting information registered in the registration step on the application software with which the computer can edit the image formation data so as to conform to the size information.

According to the above configuration, the same effects as the image forming system configured as above can be brought.

BRIEF DESCRIPTION OF THE ACCOMPANYING DRAWINGS

Figure 3:
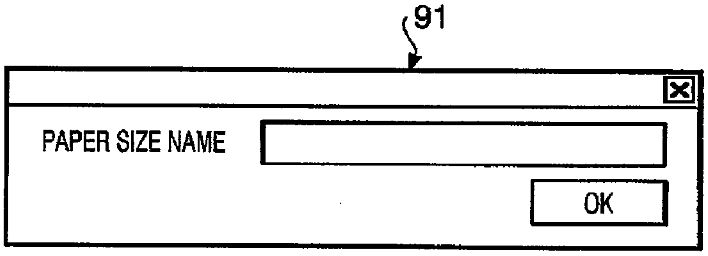

FIG. 3 schematically shows an example of a user interface for inputting a paper size name employed for the image forming system in the embodiment according to one or more aspects of the present invention.

Figures 4, 5:
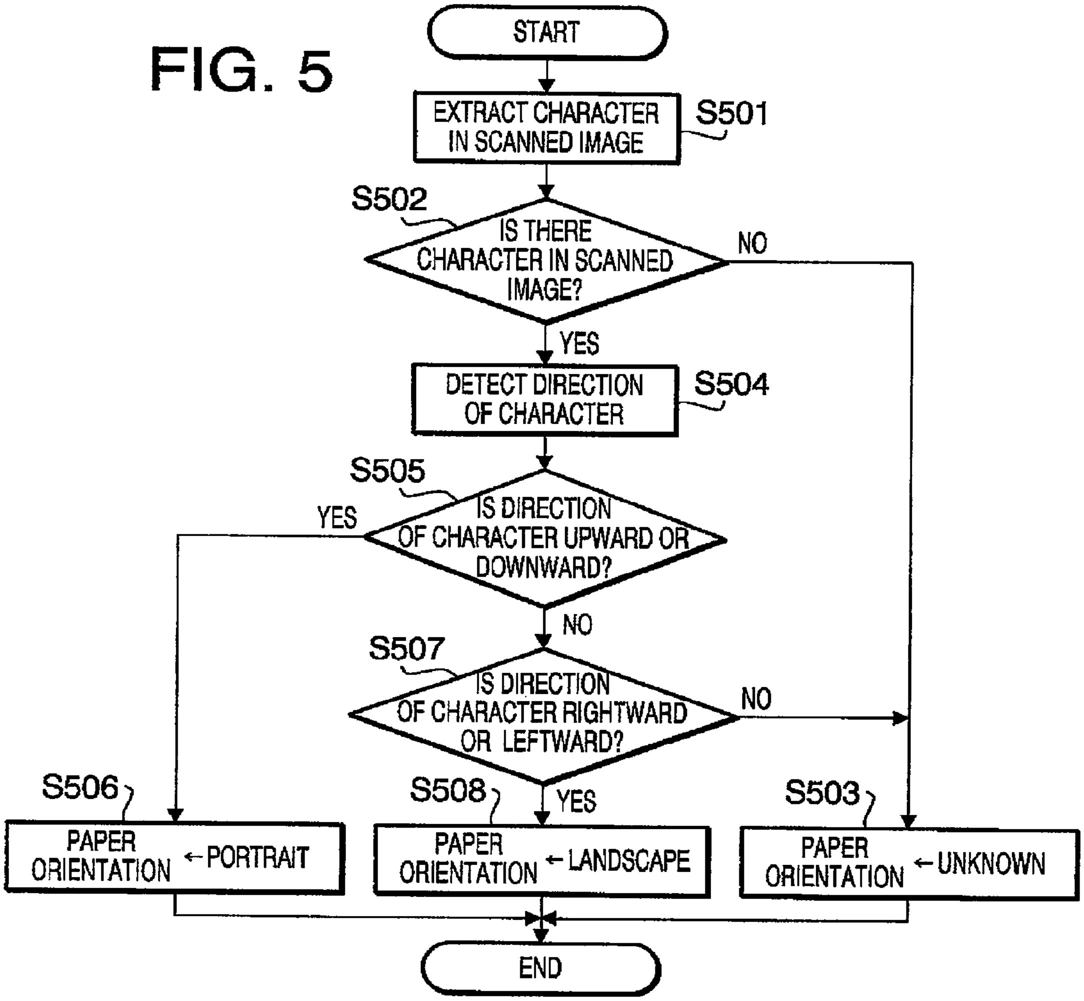

FIG. 4 schematically shows an example of setting information list employed for the image forming system in the embodiment according to one or more aspects of the present invention.

FIG. 5 is a flowchart showing more particular steps in a step S202 of the paper size registration routine employed for the image forming system in the embodiment according to one or more aspects of the present invention.

Figure 6:
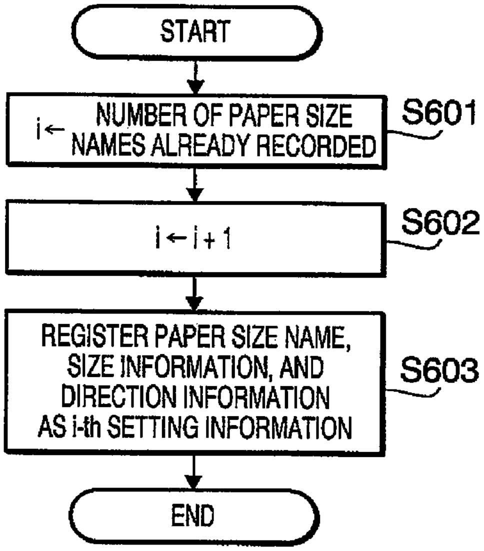

FIG. 6 is a flowchart showing more particular steps in each step of S202, S206, S208, and S209 of the paper size registration routine employed for the image forming system in the embodiment according to one or more aspects of the present invention.

Figure 7:
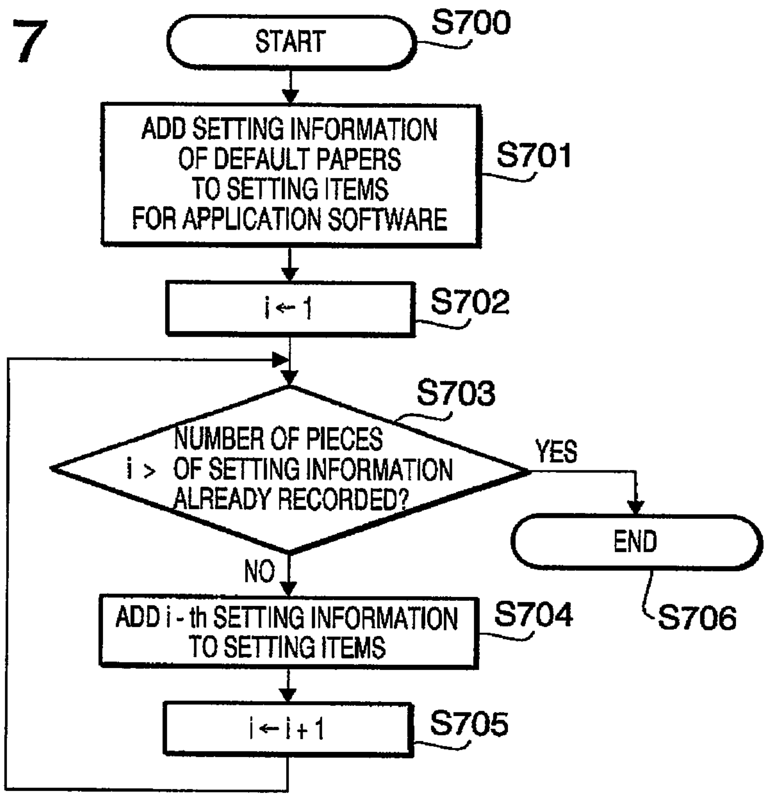

FIG. 7 is a setting item configuring routine employed for the image forming system in the embodiment according to one or more aspects of the present invention.

Figure 8:
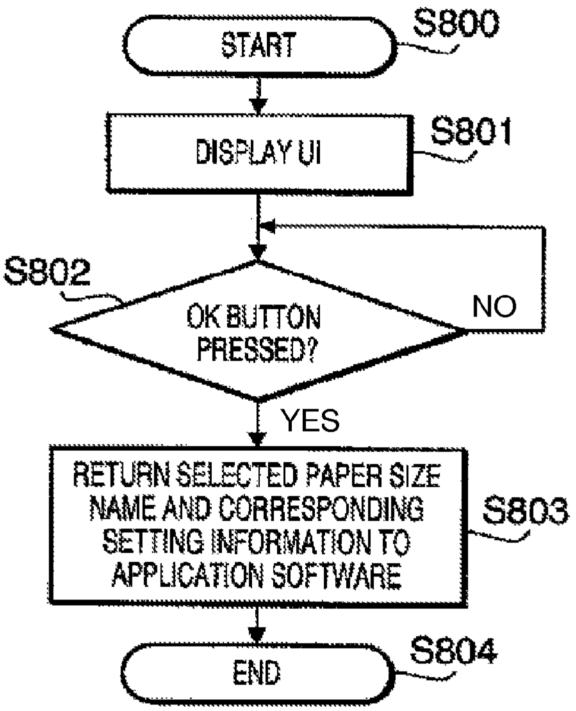

FIG. 8 is a flowchart showing a selection routine employed for the image forming system in the embodiment according to one or more aspects of the present invention.

Figure 9:
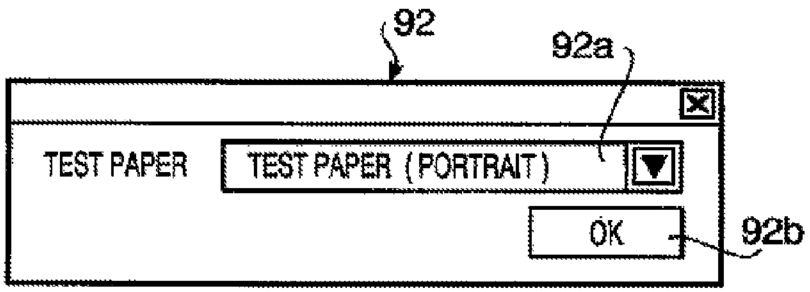

FIG. 9 schematically shows an example of a user interface for selecting the paper size name employed for the image forming system in the embodiment according to one or more aspects of the present invention.

FIGS. 10A to 10D schematically show states of a triangle subject paper turned in various directions as other examples according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the invention will be described with reference to the accompanying drawings.

Figure 1:
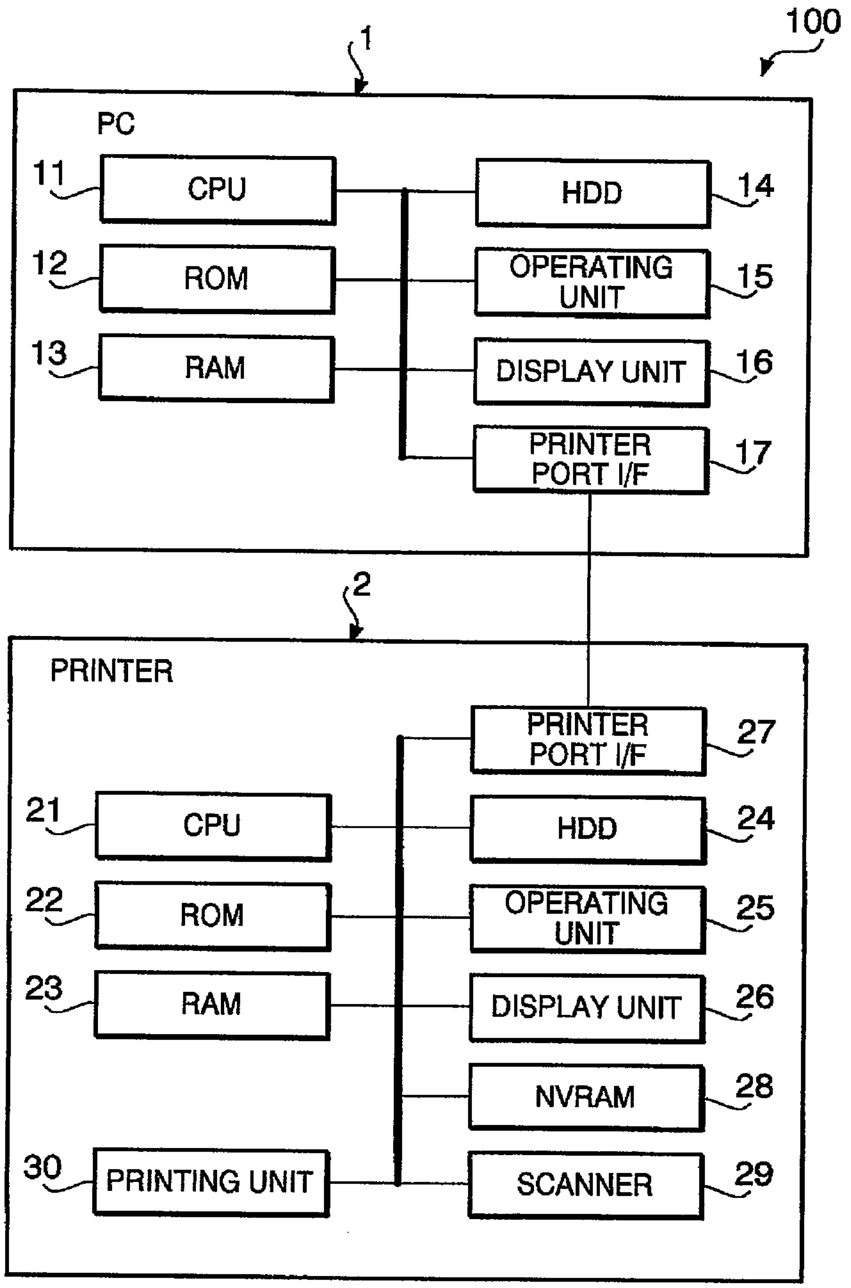
FIG. 1 is a block diagram of an image forming system in an embodiment according to one or more aspects of the present invention.

As shown in FIG. 1, an image forming system 100 in an embodiment according to aspects of the invention is provided with a printer 2 as an image forming device and a personal computer 1 as an information terminal device (hereinafter, simply referred to as "PC").

The PC 1 includes a CPU 11 that executes various processes to be executed in the PC 1, a ROM 12 that stores therein a program (BIOS) for a boot process to be executed by the CPU 11 at start-up of the PC 1, a RAM 13 used as a memory area when the CPU 11 executes various processes, and a hard disk drive (HDD) 14 that stores therein an operating system (OS) and programs for various processes to be executed by the CPU 11.

In addition, the PC 1 is provided with an operating unit 15 that includes a keyboard or mouse, a display unit 16 that includes an LCD display or the like, and a printer port interface 17 (in the present embodiment, a USB interface) through which input/output of a signal is performed with the printer 2.

Further, the PC 1 is provided with a printer driver, installed in the HDD 14, which is configured to transmit image formation data to application software with which the image formation data are edited (such as document creating software, drawing software, spreadsheet software, and photograph editing software) and the printer 2 so as to form an image.

The printer 2 is provided with a CPU 21 that executes various processes to be executed in the printer 2, a ROM 22 that stores therein a program for a boot process to be executed by the CPU 21 at start-up of the printer 2, a RAM 23 and non-volatile RAM 28 that are used as memory areas when the CPU 21 executes various processes, and a hard disk drive (HDD) 24 that stores therein programs for various processes to be executed by the CPU 21.

Additionally, the printer 2 is provided with an operating unit 25 that includes a plurality of operation buttons arranged outside a housing of the printer 2, a display unit 26 that is provided outside the housing of the printer 2 and includes an LCD panel, and a printer port interface 27 (in the present embodiment, a USB interface) through which input/output of a signal is performed with the PC 1.

Furthermore, the printer 2 has a printing unit 30 that forms an image on the recording medium such as a paper and transparent sheet for an OHP (hereinafter, which are simply referred to as "papers"). The printing unit 30 employs a generally-known image forming method such as an electrophotographic technology and an inkjet technology.

In addition, the printer 2 has an scanner 29. The scanner 29 scans a subject such as an image and printed text by sequentially illuminating the subject from one end to the other end thereof with light emitted by a plurality of linearly-aligned light sources, and then converting reflected light into an electrical signal with an imaging device. Thereby, the scanner 29 generates electronic data corresponding to the subject. As described in detail below, the scanner 29 serves as a means for obtaining size information of the paper by detecting a contour of the paper. In addition, as described in detail below, the scanner 29 serves as a means for detecting direction information of the paper by scanning an image such as textual information formed on the paper.

In the image forming system 100 in the present embodiment that includes the printer 2 and PC 1 configured as above, the user can operate the PC 1 to edit the image formation data such as a printed text, drawing, table, and photograph with the application software.

The application software acquires setting information of a plurality of kinds of papers previously registered as a paper on which the printer 2 can form an image, from the printer driver conforming to the printer 2. Then, the application software registers the acquired setting information as setting items and size setting items of the papers. Specifically, paper size names such as "A4," "A5," and "B5" are registered as a setting item "paper size." Further, for example, there are registered as a size setting item corresponding to the "A4," dimensions (210 mm×297 mm) as the size information and "landscape" or "portrait" as the direction information. In addition, there are registered as a size setting item corresponding to the "A5," dimensions (148 mm×210 mm) as the size information and "landscape" or "portrait" as the direction information.

Further, by a user's operation of the operating unit 16, there is displayed on the display unit 16, a page setting screen (for example, a below-mentioned user interface 92) on which the registered setting information is reflected. On the page setting screen, the user can select, from the setting items of the paper, setting information of a desired paper (for instance, a paper size name "A4" in the setting items, and size information (210 mm×297 mm) and direction information "landscape" in the size setting items. Additionally, on an edit screen of the application software, there are displayed an editable area on which the setting information of the desired paper selected on the page setting screen is reflected. Thereby, the user can easily edit the image formation data corresponding to the selected paper.

Then, when the user transmits the image formation data edited on the editable area from the PC 1 to the printer 2, the printing unit 30 of the printer 2 is driven, and an image conforming to the selected paper can be formed based on the image formation data.

Figure 2:
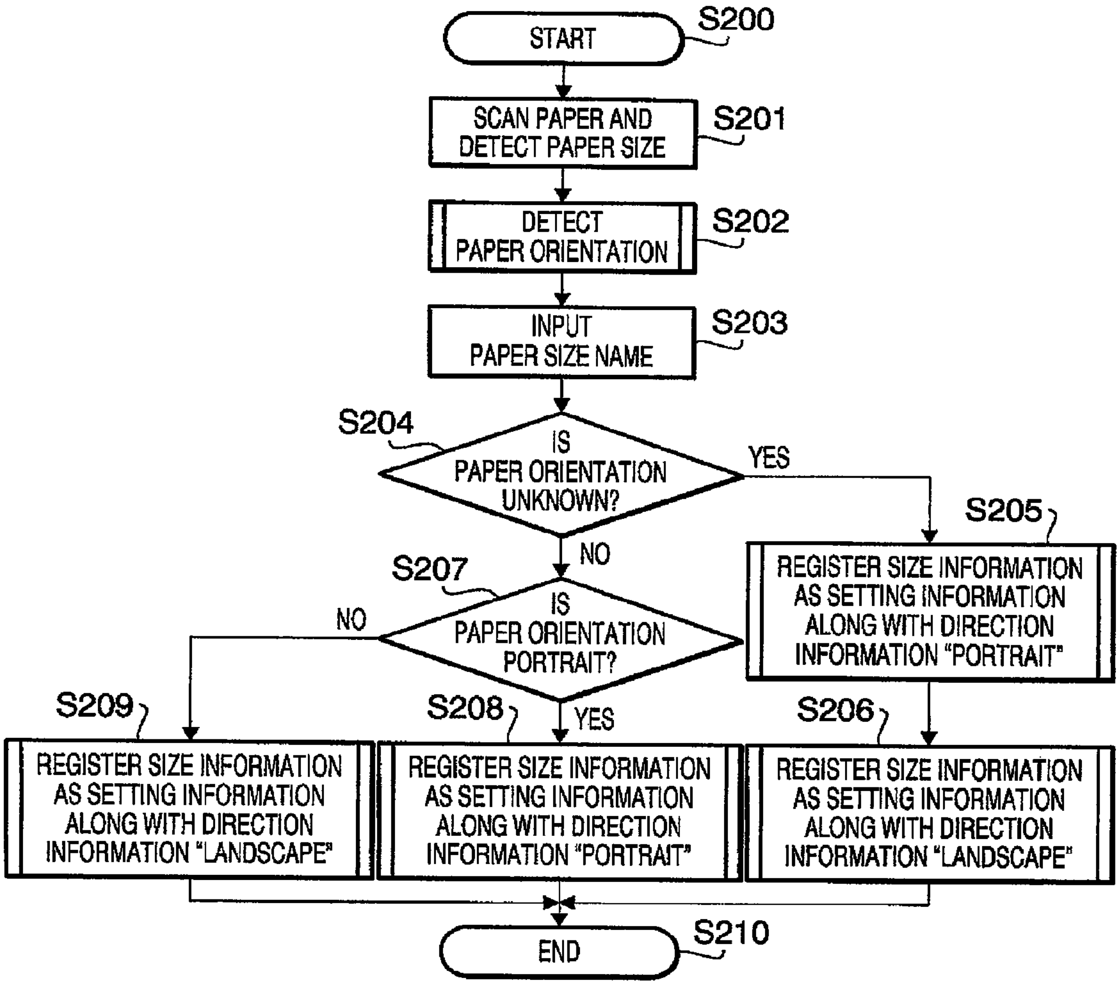
FIG. 2 is a flowchart showing a paper size registration routine employed for the image forming system in the embodiment according to one or more aspects of the present invention.

In the meantime, in the image forming system 100 of the present embodiment, it is possible to easily register setting information of a paper of a kind that has not previously been registered with the printer driver conforming to the printer 2 by executing a paper size registration routine (S200 to S210) shown in FIG. 2, even without any troublesome manual setting operation. Furthermore, it is possible to easily add the setting information of the paper of the kind that has not previously been registered to the setting items of the application software by executing a setting item configuring routine (S700 to S706) shown in FIG. 7, even without any troublesome manual setting operation. Hereinafter, the paper size registration routine will be explained.

The paper size registration routine is a control program installed in the PC 1, which is configured such that the PC 1 can receive electronic data from the scanner 29 of the printer 2 via the printer port I/Fs 17 and 27.

Further, the paper size registration routine is executed as required, for example, when the user edits the image formation data with the application software for the paper of the kind (hereinafter, referred to as a "non-registered paper") which is not previously registered with the printer driver conforming to the application software and printer 2. At this time, the user previously places the non-registered paper on the scanner 29. It is noted that, in the present embodiment, the following explanation will be given based on an assumption that the non-registered paper is a rectangle paper.

FIG. 2 is a flowchart showing a detailed procedure of the paper size registration routine. Firstly, after the paper size registration routine is started in S200 of FIG. 2, the scanner 29 scans an image on the non-registered paper placed on the scanner 29 to generate electronic data in S201. Then, the electronic data are transmitted to the PC 1 via the printer port I/Fs 17 and 27. Thereafter, through a process by the CPU 11, information regarding an outer shape (such as a contour) is extracted from the electronic data, and the size information is detected by processing the information regarding the outer shape. Specifically, the height and width of the rectangular non-registered paper are detected as the size information.

Next, in S202, through a process of the CPU 11, information regarding the image formed on the non-registered paper is extracted from the electronic data, and the direction information is detected by processing the information regarding the image.

More specifically, the step of S202 can be divided into more particular steps S501 to S508 as shown in FIG. 5.

In S501, the information regarding the image formed on the non-registered paper is extracted from the electronic data generated by the scanner 29, and further a character is extracted from the extracted information with a character recognition processing.

Next, in S502, it is judged whether a character is extracted. When it is not judged that a character is extracted (S502: No), the present process goes to S503, in which it is judged that the paper orientation is unknown, and then the step of S202 is completed.

Meanwhile, in S502, when it is judged that a character is extracted (S502: Yes), the present process goes to S504, in which a direction of each extracted character is detected. Here, when a direction in which the subject is scanned by the light emitted by the light source of the scanner 29 in a line is defined as a vertical direction, the scanned subject is placed on the scanner 29 such that the scanning direction of the scanner 29 is parallel to a longitudinal side of the scanned subject.

Subsequently, in S505, it is judged whether each extracted character is directed upward or downward. When it is judged that each character is directed upward or downward (S505: Yes), the present process goes to S506, in which it is judged that the paper orientation is landscape, and the step of S202 is completed.

Meanwhile, when it is judged in step S505 that each character is not directed upward or downward (S505: No), the present process goes to S507.

In S507, it is judged whether each character is directed rightward or leftward. When it is judged in S507 that each character is not directed rightward or leftward (S507: No), the present process goes to S503, in which it is judged that the paper orientation is unknown, and the step of S202 is completed.

Meanwhile, when it is judged in S507 that each character is directed rightward or leftward (S507: Yes), the present process goes to S508, in which it is judged that the paper orientation is portrait, and the step of S202 is completed.

As described above, after the step of S202 is completed, the present process goes to S203, in which a user interface 91 for inputting the paper size name, as shown in FIG. 3, is displayed on the display unit 16 of the PC 1, inducing the user to operate the operating unit 15 and input the size of the non-registered paper.

Subsequently, in S204, it is judged whether the paper orientation is unknown. When it is judged that the paper orientation is unknown (S204: Yes), the present process goes to S205, in which the setting information "landscape" is registered as the direction information of the non-registered paper. Thereafter, the present process goes to S206, in which the setting information "portrait" is registered as the direction information of the non-registered paper. The processes in S205 and S206 will be described below. Then, the present process goes to S210, and the paper size registration routine is terminated.

Meanwhile, in S204, it is not judged that the paper orientation is unknown (S204: No), the present process goes to S207, in which it is judged whether the paper orientation is landscape.

When it is judged in S207 that the paper orientation is landscape (S207: Yes), the present process goes to S208, in which the setting information "landscape" is registered as the direction information of the non-registered paper. The process in S208 will be described later. Then, the present process goes to S210, and the paper size registration routine is terminated.

Meanwhile, when it is not judged in S207 that the paper orientation is landscape (S207: No), the present process goes to S209, the setting information "portrait" is registered as the direction information of the non-registered paper. A detailed process in S209 will be described later. Then, the present process goes to S210, and the paper size registration routine is terminated.

A detailed procedure in each of the steps S205, S206, S208, and S209, which is divided into more particular steps S601 to S603, is shown in FIG. 6.

In S601, as shown in FIG. 4, there is substituted into a counter "i," the number of paper sizes already recorded in a setting information list 90 for the non-registered paper that is stored in a predetermined memory area such as the HDD 14 of the PC 1.

Subsequently, in S602, the counter "i" is incremented by one. Thereafter, in S603, there are registered as setting information to be i-th registered in the setting information list 90, the "paper size name," size information (height and width), and direction information (landscape or portrait) that are inputted in S203. Thus, the non-registered paper is registered by the paper size registration routine.

As concrete examples, there will be explained with reference to FIG. 4, cases where a "test paper" of 370 mm×250 mm is registered by the paper size registration routine.

1. A case where a plurality of characters directed upward (one end of the shorter sides is defined as an upper end, while the other end is defined as a lower end) are formed as an image on a surface of the test paper, and the user places the test paper on the scanner 29 (the paper is directed such that the longer sides thereof are parallel to the scanning direction of the scanner 29).

In this case, when the paper size registration routine is started, the size information "370 mm×250 mm" is received in S201, and the direction information "landscape" is received in S202 (more specifically, S501 to S508).

Subsequently, in S203, the user inputs a text "test paper" on the user interface 91 for inputting the paper size name (see FIG. 3) as the "paper size name," and presses an "OK" button.

Next, the negative judgment is made in S204 (S204: No), and the affirmative judgment is made in S207 (S207: Yes). Further, the paper size name "test paper" is registered along with the direction information "landscape" in S208 (more particularly, S601 to S603). Specifically, the paper size name "test paper" is registered along with the direction information "landscape," as "1" (first setting information) in the setting information list 90.

2. A case where a plurality of characters directed rightward (one end of the longer sides is defined as a right end, while the other end is defined as a left end) are formed as an image on the surface of the test paper, and the user places the test paper on the scanner 29 (the paper is directed such that the longer sides thereof are parallel to the scanning direction of the scanner 29).

In this case, when the paper size registration routine is started, the size information "250 mm×370 mm" is received in S201, and the direction information "portrait" is received in S202 (more specifically, S501 to S508).

Subsequently, in S203, the user inputs the text "test paper" on the user interface 91 for inputting the paper size name (see FIG. 3) as the "paper size name," and presses the "OK" button.

Next, the negative judgment is made in S204 (S204: No), and the negative judgment is made in S207 (S207: No). Further, the paper size name "test paper" is registered along with the direction information "portrait" in S209 (more particularly, S601 to S603). Specifically, the paper size name "test paper" is registered along with the direction information "portrait," as "2" (second setting information) in the setting information list 90.

3. A case where no image such as a character is formed on the surface of the test paper, and the user places the test paper on the scanner 29 (the paper is directed such that the longer sides thereof are parallel to the scanning direction of the scanner 29).

In this case, when the paper size registration routine is started, the size information "370 mm×250 mm" is received in S201, and the direction information "unknown" is received in S202 (more particularly, S501 to S508).

Subsequently, in S203, the user inputs the text "test paper" on the user interface 91 for inputting the paper size name (see FIG. 3) as the "paper size name," and presses the "OK" button.

Next, the affirmative judgment is made in S204 (S204: Yes). Then, the paper size name "test paper" is registered along with the direction information "landscape" in S205 (more particularly, S601 to S603). Further, the paper size name "test paper" is registered along with the direction information "portrait" in S206 (more particularly, S601 to S603). Specifically, by executing the paper size registration routine once, the above two pieces of setting information are registered as "1" and "2" in the setting information list 90, respectively.

Then, when a setting item configuring routine (S700 to S706), as shown in FIG. 7, is executed, the setting information recorded in the setting information list 90 for the non-registered paper is added to the setting items of the application software.

firstly, when the setting item configuring routine is started in S700, setting information of default papers is added to the setting items regarding the paper of the application software (S701). The default papers represent papers supported by the printer driver from the beginning, such as a paper with the A4 size and a paper with the B5 size.

Next, in S702, one is substituted into a counter "i."

Subsequently, in S703, it is judged whether the counter "i" is more than the number of the "paper size names" already recorded in the setting information list 90 for the non-registered paper. For example, as shown in FIG. 4, when three "paper size names" and setting information corresponding thereto have been recorded, the counter "i" is compared with "3."

When the judgment in S703 is negative (S703: No), the i-th setting information from the top of the setting information list 90 is added to the end of the setting items of the application software (S704). Then, after the counter "i" is incremented by one in S705, the present process goes back to S703. A loop of the steps S703 to S705 is repeated until the judgment in S703 becomes affirmative. When the judgment in S703 becomes affirmative (S703: Yes), the present process goes to S706, and the setting item configuring routine is terminated.

Then, when the user wishes to edit the image formation data with the application software and form the image on a desired paper (for example, the test paper), a selection routine, as shown in FIG. 8, is executed, and the size of the desired paper (for example, the size of the test paper) is selected.

Firstly, when the selection routine is started in S800, in S801, there is displayed on the display unit 16 of the PC 1, the user interface 92 for selecting the paper size name shown in FIG. 9. Then, when the user selects a desired "paper size name" (for example, "test paper") from a list of the setting items "paper size name" that is displayed by pressing a mark "V" in a selecting field 92*a* of the user interface 92 for selecting the paper size name, a "paper size name" (for example, "test paper") selected by the user is displayed in the selecting field 92*a* of the user interface 92. Here, by pressing an "OK" button 92*b* (S802: Yes), the selected "paper size name" is fixed.

Unless the "OK" button 92*b* is pressed In S802 (S802: No), the step S802 is repeated until the "OK" button 92*b* is pressed.

Meanwhile, when the "OK" button 92*b* is pressed in S802 (S802: Yes), the selected "paper size name" and setting information corresponding thereto are returned to the application software, and reflected on the application software (S803). Thereafter, the present process goes to S804, and the selection routine is terminated.

Thereby, the application software can create the image formation data conforming to the paper selected by the user.

According to the image forming system 100 configured as above in the present embodiment, the size information of the paper can be detected by the scanner 29. Further, the size information can be reflected on the application software such that the image formation data can be edited so as to conform to the size information. Therefore, the user can easily edit the image formation data with the application software such that the image formed based on the image formation data is not drawn beyond the paper, and such that a margin on the paper is not excessively enlarged.

Thus, the image forming system 100 in the present embodiment can easily edit the image formation data conforming to the paper.

Further, the image forming system 100 in the present embodiment can allow the user to select setting information that the user wishes to reflect on the application software from the setting information recorded in the setting information list 90. Therefore, the setting information selected by the user can easily be reflected on the application software. Accordingly, the image forming system 100 in the present embodiment can more easily edit the image formation data conforming to the paper.

Furthermore, the image forming system 100 in the present embodiment can add, to the setting information list 90, the setting information that has not yet recorded therein.

Hence, when a plurality of particular sizes of papers are frequently used, the image forming system 100 can acquire setting information of the plurality of particular sizes of papers, and add the acquired setting information to the setting information list 90. Thus, the user can be freed from troublesome manual operations for inputting the setting information.

Additionally, the image forming system 100 can input the paper size name on the user interface 91 for inputting the paper size name. Therefore, a paper size name desired by each user can easily be inputted on the user interface 91.

Further, the image forming system 100 can add setting information for both cases where the paper is directed in the landscape orientation and where the paper is directed in the portrait orientation, at a time, through a single scanning operation by the scanner 29, when the paper orientation is unknown. Thus, the user can be freed from troublesome manual operations for adding the setting information.

Furthermore, the image forming system 100 can detect the direction information of the paper based on the data obtained through the scanning operation by the scanner 29, and add the direction information to the setting information list 90. Thus, the user can be freed from troublesome manual operations for inputting the direction information.

It is noted that the above detecting the direction information of the paper is achieved by detecting the direction of the character formed as an image on the paper. Thereby, the direction information can certainly be acquired.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

Figures 10A, 10B, 10C, 10D:
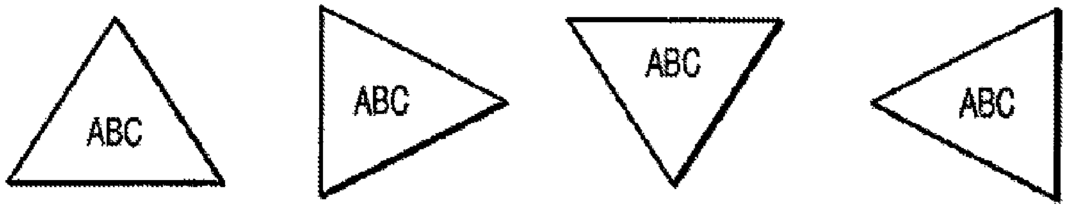

For example, when an outer shape of a subject paper is triangle as shown in FIG. 10A, the editable area displayed on the edit screen is set to be triangle to meet the outer shape of the subject paper shown in FIG. 10A.

Additionally, in the present embodiment, when adding setting information of the rectangular non-registered paper, the direction information includes only two kinds of information "landscape" and "portrait" (namely, 0 degree rotation and 90 degree rotation). However, the present invention is not limited to such two kinds of information. For example, when an outer shape of a subject paper is triangle as shown in FIG. 10A, the direction information may include four kinds of information "0 degree rotation" as shown in FIG. 10A, "90 degree rotation" as shown in FIG. 10B, "180 degree rotation" as shown in FIG. 10C, and "270 degree rotation" as shown in FIG. 10D.

Furthermore, the number of the pieces of the setting information of the non-registered paper that can be registered in the setting information list 90 may be restricted. Then, when newly registering setting information of a non-registered paper, the oldest piece of setting information may be overwritten in the case where the number of the pieces of the setting information already reaches the restricted number. In addition, when newly registering setting information of a non-registered paper, in the case where the same piece of setting information has already been registered, the same piece of setting information may be overwritten.

What is claimed is:

1. An image forming system, comprising:

an information terminal device configured to edit image formation data with application software;

an image forming device configured to form an image on a recording medium based on the image formation data edited by the information terminal device, wherein the image forming device is further configured to be operated using a driver different from the application software; and a first detecting unit configured to detect size information of the recording medium, wherein, upon execution of computer readable instructions, the information terminal device is configured to function as:

a registration unit configured to register the size information, detected by the first detecting unit, as setting information;

an adding unit configured to add the setting information as selectable setting items in the application software;

a selecting unit configured to receive an input for selecting desired setting information from the selectable setting items;

a displaying unit configured to display an edit screen including an editable area for allowing a user to edit the image formation data when executing the application software; and a reflecting unit configured to visually change a size of the editable area in the edit screen displayed by the displaying unit based on the selected setting information in the application software so as to conform to the size information.

2. The image forming system according to claim 1, wherein the display unit is further configured to display the selectable setting items for the application software, wherein the plurality of selectable setting items are displayed on the display unit for selection through the selection unit.

3. The image forming system according to claim 1, wherein, each time the registration unit registers setting information, the adding unit is configured to add the setting information registered by the registration unit to the selectable setting items for the application software.

4. The image forming system according to claim 1, wherein the size information of the recording medium, registered as the setting information by the registration unit, includes size information of the recording medium in a state where the recording medium is oriented in a predetermined in-plane direction with respect to the image forming device.

5. The image forming system according to claim 4, wherein the registration unit is configured to register direction information representing the predetermined in-plane direction in which the recording medium is oriented with respect to the image forming device as the setting information along with the size information of the recording medium in the state turned in the predetermined in-plane direction.

6. The image forming system according to claim 1, further comprising a second detecting unit configured to detect direction information of the recording medium that represents an in-plane direction in which the recording medium is oriented with respect to the image forming device, wherein the registration unit is configured to register the direction information detected by the second detecting unit as the setting information along with the size information detected by the first detecting unit.

7. The image forming system according to claim 6, wherein the second detecting unit is configured to detect the direction information of the recording medium by recognizing a direction of an image formed on the recording medium.

8. The image forming system according to claim 6, further comprising an input unit configured to receive an input of a size name of the recording medium, wherein the registration unit is configured to register the size name inputted through the input unit as the setting information along with the size information detected by the first detecting unit and the direction information detected by the second detecting unit.

9. The image forming system according to claim 1, further comprising an input unit configured to receive an input of a size name of the recording medium, wherein the registration unit is configured to register the size name inputted through the input unit as the setting information along with the size information detected by the first detecting unit.

10. An image forming system, comprising:

an information terminal device configured to edit image formation data with application software;

an image forming device configured to form an image on a recording medium based on the image formation data edited by the information terminal device;

a first detecting unit configured to detect size information of the recording medium;

a second detecting unit configured to detect direction information of the recording medium that represents an in-plane direction in which the recording medium is oriented with respect to the image forming device; and an input unit configured to receive an input of a size name of the recording medium, wherein, upon execution of computer readable instructions, the information terminal device is configured to function as:

a registration unit configured to register: (a) the size information detected by the first detecting unit, (b) the direction information detected by the second detecting unit, and (c) the size name inputted through the input unit as setting information;

an adding unit configured to add the setting information registered by the registration unit as setting items in the application software, wherein the application software is different from a driver used to operate the image forming device;

a selecting unit configured to receive an input for selecting desired setting information from the setting items;

a displaying unit configured to display an edit screen including an editable area for allowing a user to edit the image formation data when executing the application software; and a reflecting unit configured to visually change a size of the editable area in the edit screen displayed by the displaying unit based on the selected desired setting information in the application software so as to conform to the size information.

11. A non-transitory computer readable medium having computer readable instructions stored thereon, which cause a computer, configured to edit image formation data with application software and to be connectable with an external image forming device that forms an image on a recording medium based on the edited image formation data, to perform steps of:

detecting size information of the recording medium;

registering the size information detected in the detecting step as setting information;

adding the setting information as selectable setting items in the application software, wherein the application software is different from a driver used to operate the external image forming device;

receiving input for selecting desired setting information from the selectable setting items;

displaying an edit screen including an editable area for allowing a user to edit the image formation data when executing the application software; and visually changing a size of the editable area in the displayed edit screen based on the selected setting information in the application software so as to conform to the size information.

12. The image forming system of claim 1, wherein the reflecting unit is further configured to define a shape of the editable area based on recording medium shape information.

13. The image forming system of claim 1, wherein the first detecting unit is configured to the detect size information of the recording medium, the registration unit is configured to register the size information, detected by the first detecting unit, as setting information, and the adding unit is configured to add the setting information as selectable setting items in the application software, all when a user edits image formation data with the application software.

14. The image forming system of claim 6, wherein the second detecting unit is configured to distinguish between at least three different rotations of the recording medium.

* * * * *